United States Patent
Gorti et al.

(10) Patent No.: US 6,701,389 B2
(45) Date of Patent: Mar. 2, 2004

(54) BANDWIDTH ALLOCATION IN ACCORDANCE WITH SHARED QUEUE OUTPUT LIMIT

(75) Inventors: Brahmanand Kumar Gorti, Cary, NC (US); Dongming Hwang, Cary, NC (US); Clark Debs Jeffries, Durham, NC (US); Michael Steven Siegel, Raleigh, NC (US); Kartik Sudeep, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 346 days.

(21) Appl. No.: 09/876,358

(22) Filed: Jun. 7, 2001

(65) Prior Publication Data

US 2003/0007452 A1 Jan. 9, 2003

(51) Int. Cl.⁷ .................................................. G06F 3/00
(52) U.S. Cl. ........................................................ 710/29
(58) Field of Search ............................. 710/29, 52, 53, 710/56, 57

(56) References Cited

U.S. PATENT DOCUMENTS

| | | |
|---|---|---|
| 5,519,701 A | 5/1996 | Colmant et al. |
| 5,539,747 A | 7/1996 | Ito et al. |
| 5,566,175 A | 10/1996 | Davis |
| 5,689,500 A | 11/1997 | Chiussi et al. |
| 5,757,771 A | 5/1998 | Li et al. |
| 5,784,569 A | 7/1998 | Miller et al. |
| 5,978,359 A | 11/1999 | Caldara et al. |
| 6,252,848 B1 * | 6/2001 | Skirmont ..................... 370/229 |
| 2002/0131365 A1 * | 9/2002 | Barker et al. ............... 370/235 |
| 2002/0163914 A1 * | 11/2002 | Dooley ........................ 370/394 |

* cited by examiner

Primary Examiner—Kim Huynh
Assistant Examiner—David Martinez
(74) Attorney, Agent, or Firm—Bracewell and Patterson (57) ABSTRACT

A method for dynamically adjusting the flow rate of a plurality of logical pipes that share a common output queue. In accordance with the method of the present invention, a minimum flow rate and a maximum flow rate are set for each of the pipes. Next a determination is made of whether or not excess queue bandwidth exists in accordance with the output flow rate of the shared queue. The determination of whether or not excess bandwidth exists comprises comparing the output flow rate of the shared queue with a pre-determined threshold queue output value. An instantaneous excess bandwidth signal has a value of 1 if there is excess bandwidth and is otherwise 0 if there is no excess bandwidth. In an alternate embodiment, the instantaneous excess bandwidth signal for a particular pipe is logically ANDed with one or more additional excess bandwidth signals to form a composite instantaneous excess bandwidth signal. In response to the existence of excess queue bandwidth, a flow rate of a pipe is linearly increased while in response to a lack of excess queue bandwidth, the flow rate of the pipe is exponentially decreased.

33 Claims, 8 Drawing Sheets

BANDWIDTH ALLOCATION IN ACCORDANCE WITH SHARED QUEUE OUTPUT LIMIT

CROSS REFERENCE TO RELATED APPLICATIONS

The present application is related to the following copending U.S. patent applications: U.S. patent application Ser. No. 09/448,380 filed on Nov. 23, 1999, titled "Method And System For Controlling Transmission of Packets In Computer Networks"; U.S. patent application Ser. No. 09/448,190 filed on Nov. 23, 1999, titled "Method And System For Providing Optimal Discard Fraction"; and U.S. patent application Ser. No. 09/448,197 filed on Nov. 23, 1999, titled "Method And System For Providing Differentiated Services In Computer Networks". The above-mentioned patent applications are assigned to the assignee of the present invention and are incorporated herein by reference.

BACKGROUND OF THE INVENTION

1. Technical Field

The present invention relates in general to telecommunication networks, and in particular to a method and system for efficiently allocating bandwidth among multiple pipes that share a common queue. Still more particularly, the present invention relates to dynamically adjusting bandwidth allocation among multiple pipes that share a common queue in accordance with a maximum output threshold level required for preventing downstream congestion.

2. Description of the Related Art

Figure 1:
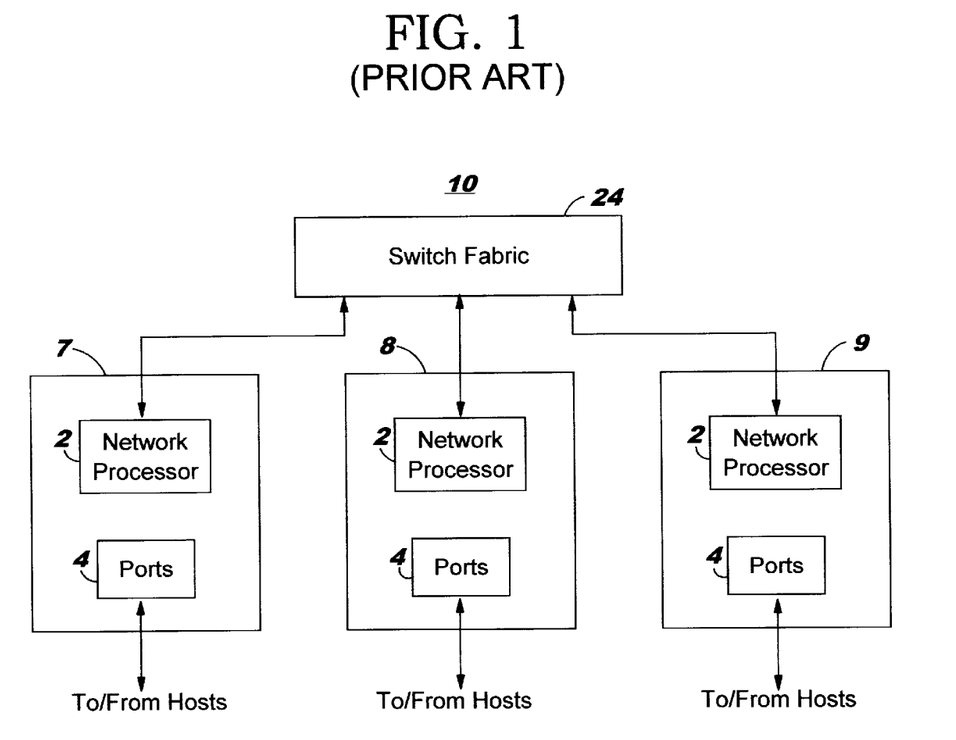
FIG. 1 is a high-level block diagram of a switch wherein a preferred embodiment of the present invention may be implemented.

Switches are often used in telecommunications to couple portions of a network together or to couple networks. For example, FIG. 1 depicts a high-level block diagram of a switch 10 that can be implemented within a telecommunication network. Switch 10 includes a switch 24 fabric coupled with blades 7, 8 and 9. Each of blades 7, 8 and 9 is generally a circuit board and includes at least a network processor 2 coupled with ports 4. Each of ports 4 are in turn coupled with hosts (not shown). Blades 7, 8 and 9 can provide traffic to switch fabric 24 and accept traffic from switch fabric 24. Thus, any host connected with one of blades 7, 8 or 9 can communicate with another host connected to another of blades 7, 8 or 9.

Figure 2A:
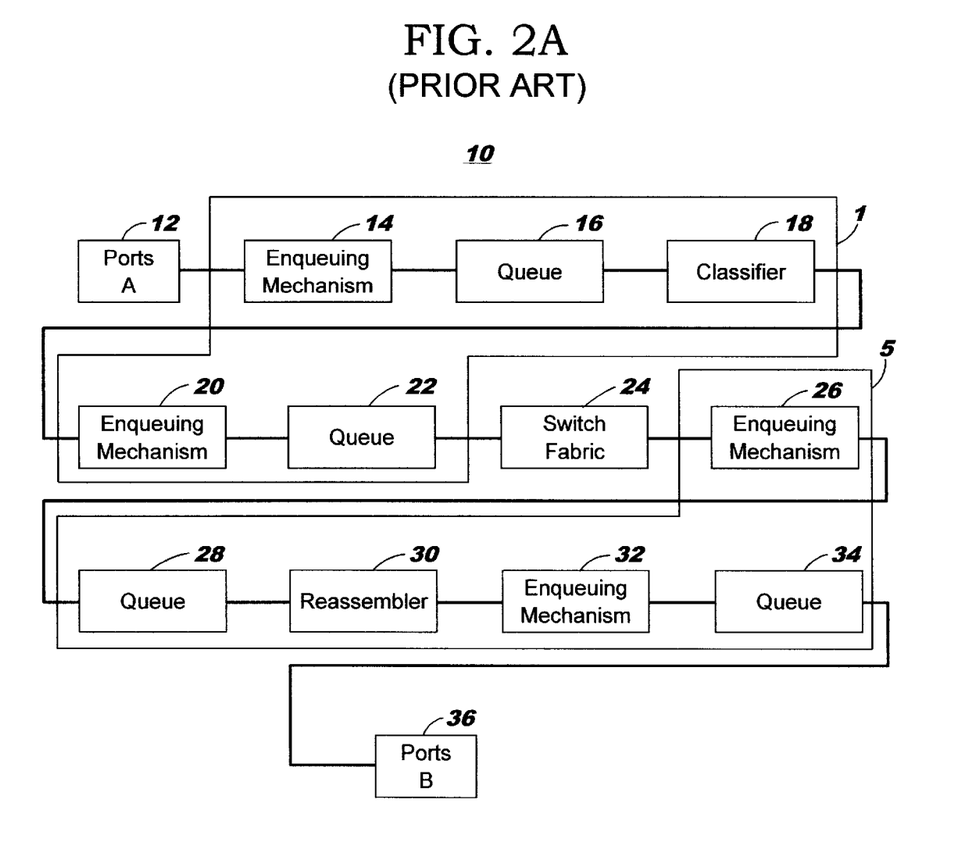
FIG. 2A is a simplified block diagram depicting a switch wherein a preferred embodiment of the present invention may be implemented.

FIG. 2A depicts a simplified block diagram of switch 10, wherein the functionality of the network processors is illustrated. Switch 10 couples hosts (not shown) connected with ports A 12 with those hosts (not shown) connected with ports B 36. Switch 10 performs various functions including classification of data packets delivered to switch 10, transmission of data packets across switch 10 and reassembly of packets. These functions are performed by a classifier 18, switch fabric 24, and a reassembler 30, respectively. Classifier 18 classifies packets that are provided to it and divides each packet into convenient-sized portions, which will be termed cells. Switch fabric 24 is a matrix of connections through which the cells are transmitted on their way through switch 10. Reassembler 30 reassembles the cells into the appropriate packets. The packets can then be provided to the appropriate port or ports 36, and output to the destination hosts. Classifier 18 may be part of one network processor 1, while reassembler 30 may be part of another network processor 5. The depicted portions of network processor 1 and network processor 5 process traffic traveling to and from ports A 12 and ports B 36. Thus, each network processor 1 and 5 can perform classification and reassembly functions. Furthermore, each network processor 1 and 5 can be a network processor 2 shown in FIG. 1.

Continuing with FIG. 2A, due to traffic bottlenecks that arise across switch 10, data packets maybe required to wait prior to execution of the classification, transmission and reassembly functions. Several queues 16, 22, 28 and 34 address this situation by providing convenient storage locations for delayed packets. Enqueuing mechanisms 14, 20, 26 and 32 are coupled to queues 16, 22, 28, and 34, respectively. Enqueuing mechanisms 14, 20, 26 and 32 enqueue the packets or cells into the corresponding queues 16, 22, 28 and 34 and can furthermore provide a suitable notification to the host from which an enqueued packet originated.

Figure 2B:
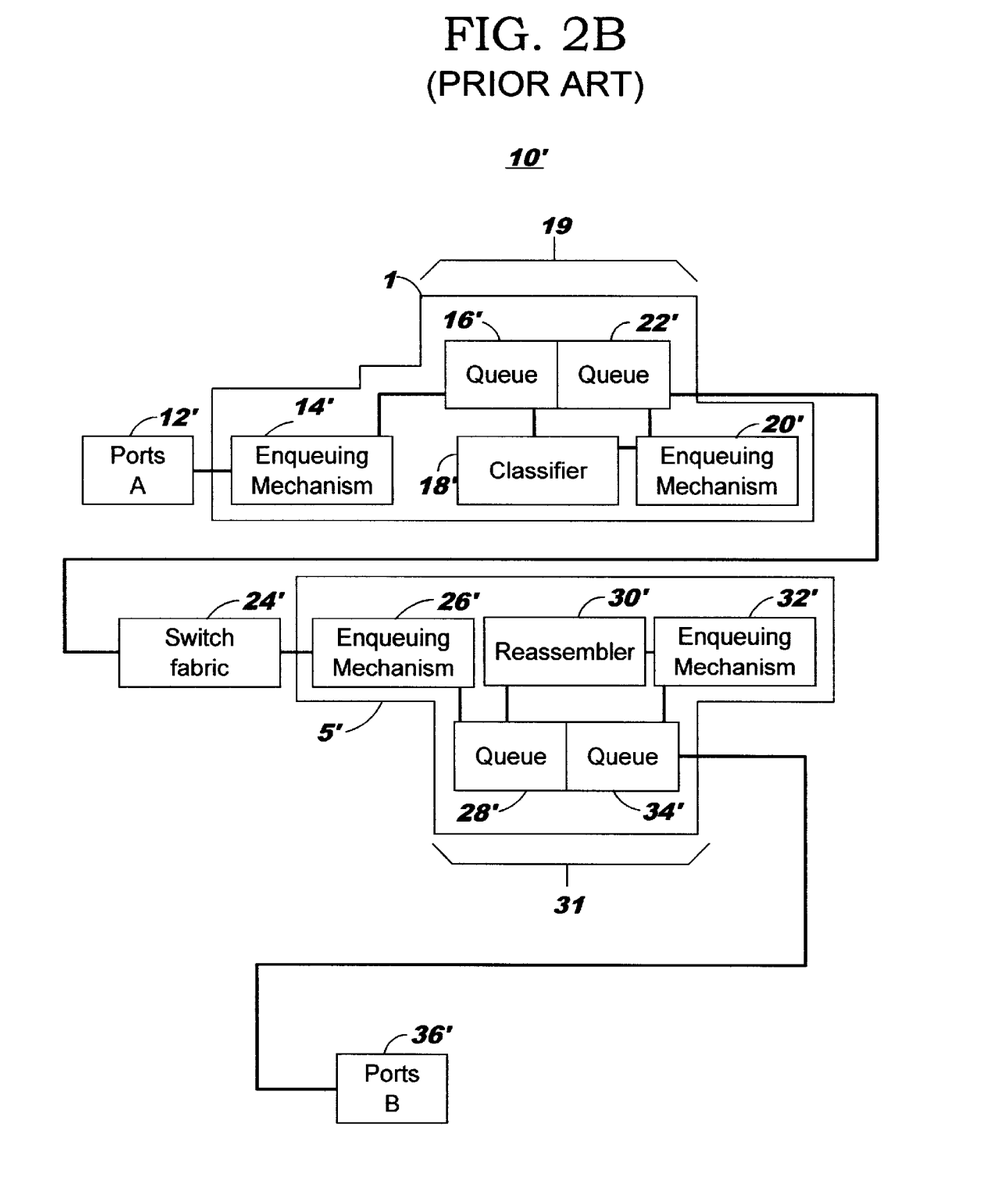
FIG. 2B is a simplified block diagram illustrating another switch wherein a preferred embodiment of the present invention may be implemented.

Although queues 16, 22, 28 and 34 are depicted separately, one of ordinary skill in the art will readily realize that some or all of the queues 16, 22, 28 and 34 may be part of the same physical memory resource. FIG. 2B depicts one such switch 10'. Many of the components of switch 10' are analogous to components of switch 10. Such components are, therefore, labeled similarly. For example, ports A 12' in switch 10' correspond to ports A 12 in switch 10. As depicted in FIG. 2B, switch 10', a queue 16', and a queue 22' share a single memory resource 19. Similarly, a queue 28' and a queue 34' are part of another single memory resource 31. Thus, in switch 10', queues 16', 22', 28' and 34' are logical queues partitioned from memory resources 19 and 31.

Conventional switches process traffic flows from switch queues uniformly. There is, however, a trend toward providing customers with different services based, for example, on the price paid by a consumer for service. A consumer may wish to pay more to ensure a faster response or to ensure that the traffic for the customer will be transmitted even when traffic for other customers is dropped due to congestion. Thus, the concept of differential services has been developed. Differentiated services (Diffserv) can provide different levels of service, or flows of traffic through the network, for differentiated customers.

DiffServ is an emerging Internet Engineering Task Force (IETF) standard for providing differentiated services (see IETF RFC 2475 and related RFCs). Diffserv is based on behavior aggregate flows. A behavior aggregate flow can be viewed as a pipeline from one edge of the network to another edge of the network. Within each behavior aggregate flow, there could be hundreds of sessions between individual hosts. However, DiffServ is unconcerned with sessions within a behavior aggregate flow. Instead, DiffServ is concerned with allocation of bandwidth between the behavior aggregate flows. According to DiffServ, excess bandwidth is to be allocated fairly between behavior aggregate flows. Furthermore, one interpretation of DiffServ provides criteria, discussed below, for measuring the level of service provided to each behavior aggregate flow.

Figure 3:
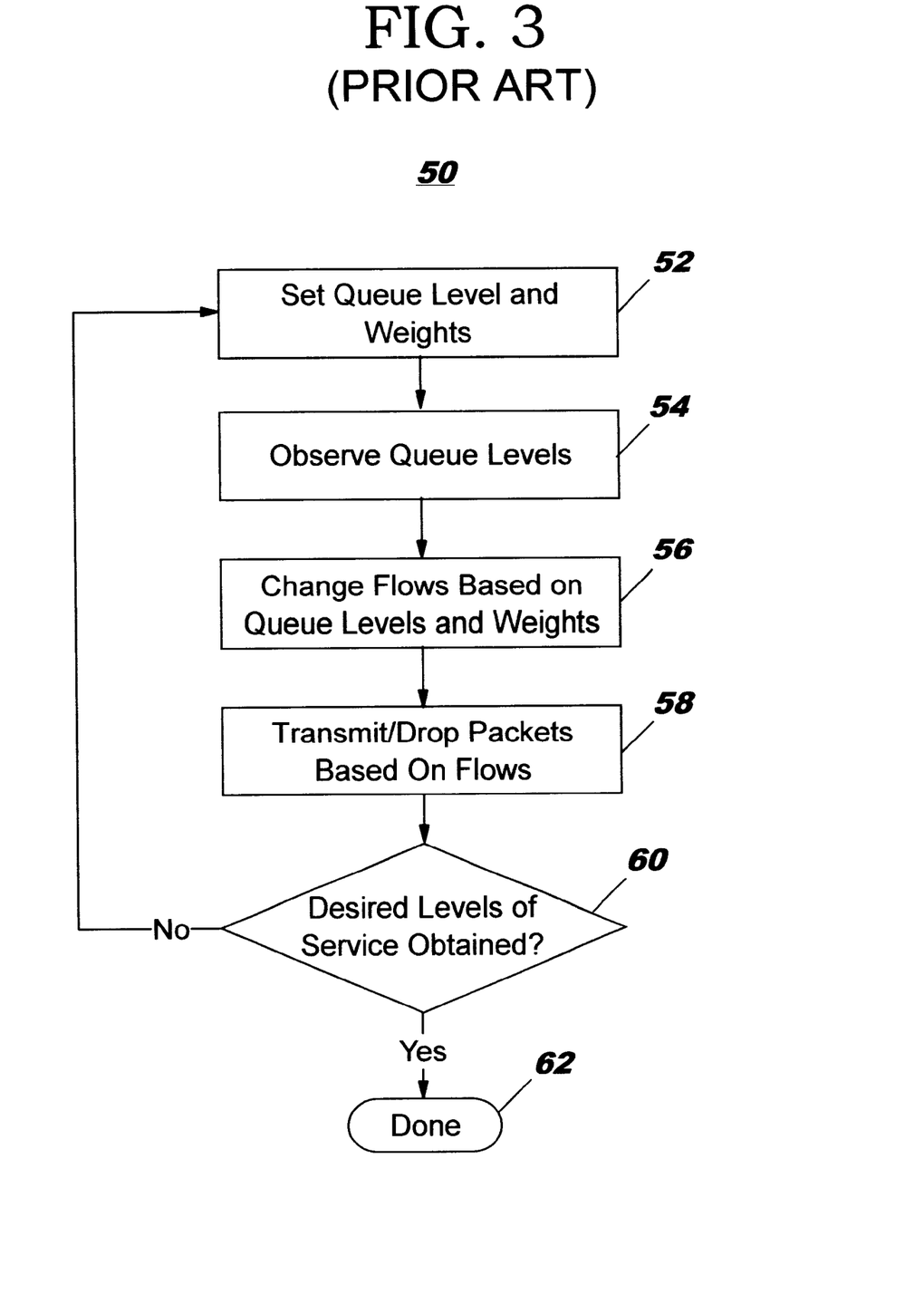
FIG. 3 is a flow diagram depicting a conventional method for providing different levels of service through a switch.

A mechanism for providing different levels of services utilizes a combination of weights and a queue level to provide different levels of services. FIG. 3 depicts such a conventional method 50. The queue level thresholds and weights are set, via step 52. Typically, the queue level thresholds are set in step 52 by a network administrator turning knobs. The weights can be set for different pipes, or flows, through a particular queue, switch 10 or network processor 1 or 5. Thus, the weights are typically set for different behavior aggregate flows. The queue levels are observed, typically at the end of a period of time known as an epoch, via step 54. The flows for the pipes are then changed based on how the queue level compares to the queue level threshold and on the weights, via step 56. Flows for pipes having a higher weight undergo a greater change in step 56. The flow for a pipe determines what fraction of traffic offered to a queue, such as the queue 15, by the pipe will be transmitted to the queue 16 by the corresponding enqueuing mechanism, such as the enqueuing mechanism 14. Traffic is thus transmitted to the queue or dropped based on the flows, via step 58. A network administrator then determines whether the desired levels of service are being met, via step 60. If so, the network administrator has completed his or her task. However, if the desired level of service is not achieved, then the queue level thresholds and, possibly, the weights are reset, via step 52 and the method 50 repeats.

Although the method 50 functions, one of ordinary skill in the art will readily realize from 10 that it is difficult to determine what effect changing the queue level thresholds will have on particular pipes through the network. A network administrator using the method 50 may have to engage in a great deal of experimentation before reaching the desired flow rate for different customers, or pipes (behavior aggregate flows) in a computer network. This problem is particularly acute with regard to determining the effect that queue thresholds will have on downstream traffic. Conventional bandwidth allocation techniques require feedback from downstream devices as a parameter for adjusting shared queue pipe flow rates and are thus subject to increased cycle adjustment latency.

Furthermore, the method 50 only has indirect and imprecise effects on parameters that are typically used to measure the quality of service. Queue levels are not a direct measure of criteria typically used to characterize a particular service. Typically, for example in DiffServ (see IETF RFC 2475 and related RFCs), levels of service are measured by four parameters: drop rate, bandwidth, latency and jitter. The drop rate is the percentage of traffic that is dropped as it flows across a switch. The bandwidth of a behavior aggregate flow is a measure of the amount of traffic for the behavior aggregate flow which crosses the switch and reaches its destination. Latency is the delay incurred in sending traffic across the network. Jitter is the variation of latency with time. The queue levels are not considered to be a direct measure of quality of service. Thus, the method 50 does not directly address any of the criteria for quality of service. Thus, it is more difficult for a network administrator to utilize the method 50 for providing different levels of service.

Another conventional method for controlling traffic utilizes flows, minimum flow rates, weights, priorities, thresholds and a signal indicating that excess bandwidth, or ability to transmit traffic, exists in order to control flows. However, it is not clear that this conventional method is a stable mechanism for controlling the output rate from a port in a switch. Consequently, this conventional method may not adequately control traffic through switch 10.

It can therefore be appreciated that a need exists within a shared queue environment for allocating bandwidth among a plurality of pipes that such differentiated services may be provided while observing an output flow limit from the shared queue. The present invention addresses such a need.

SUMMARY OF THE INVENTION

A method for dynamically adjusting the flow rate of a plurality of logical pipes that share a common output queue is disclosed herein. In accordance with the method of the present invention, a minimum flow rate and a maximum flow rate are set for each of the pipes. Next a determination is made of whether or not excess queue bandwidth exists in accordance with the output flow rate of the shared queue. The determination of whether or not excess bandwidth exists comprises comparing the output flow rate of the shared queue with a pre-determined threshold queue output value. An instantaneous excess bandwidth signal has a value of 1 if there is excess bandwidth and is otherwise 0 if there is no excess bandwidth. In an alternate embodiment, the instantaneous excess bandwidth signal for a particular pipe is logically ANDed with one or more additional excess bandwidth signals to form a composite instantaneous excess bandwidth signal. In response to the existence of excess queue bandwidth, a flow rate of a pipe is linearly increased while in response to a lack of excess queue bandwidth, the flow rate of the pipe is exponentially decreased.

All objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

This invention is described in a preferred embodiment in the following description with reference to the figures. While this invention is described in terms of the best mode for achieving this invention's objectives, it will be appreciated by those skilled in the art that variations may be accomplished in view of these teachings without deviating from the spirit or scope of the present invention.

Although, the present invention will be described herein in terms of a particular system and particular components, one of ordinary skill in the art will readily recognize that this method and system will operate effectively for other components in a computer network. The present invention will also be described in the context of a queue. However, one of ordinary skill in the art will readily recognize that the present invention functions effectively when queues are logical queues partitioned from a single memory resource or when the queues comprise separate memory resources. Furthermore, the present invention functions analogously when controlling flows into a subqueue of a particular logical queue. The present invention will also be discussed in terms of controlling network flows by proactively discarding packets. However, one of ordinary skill in the art will readily realize that the method and system control the rate of packets arriving in a queue and that a signal sent to a source and dictating a fraction of packets to be sent, with others held at the source, would be effective. Therefore, control of a transmit fraction is analogous control of a rate at which packets are offered, for example by one or more sources. Furthermore, the present invention will be described in terms of pipes, or flows provided, to a queue. However, one of ordinary skill in the art will readily realize that the pipes could be behavior aggregate flows of different or the same class or any offered rate into a particular component which utilizes a queue for storage.

Figure 4:
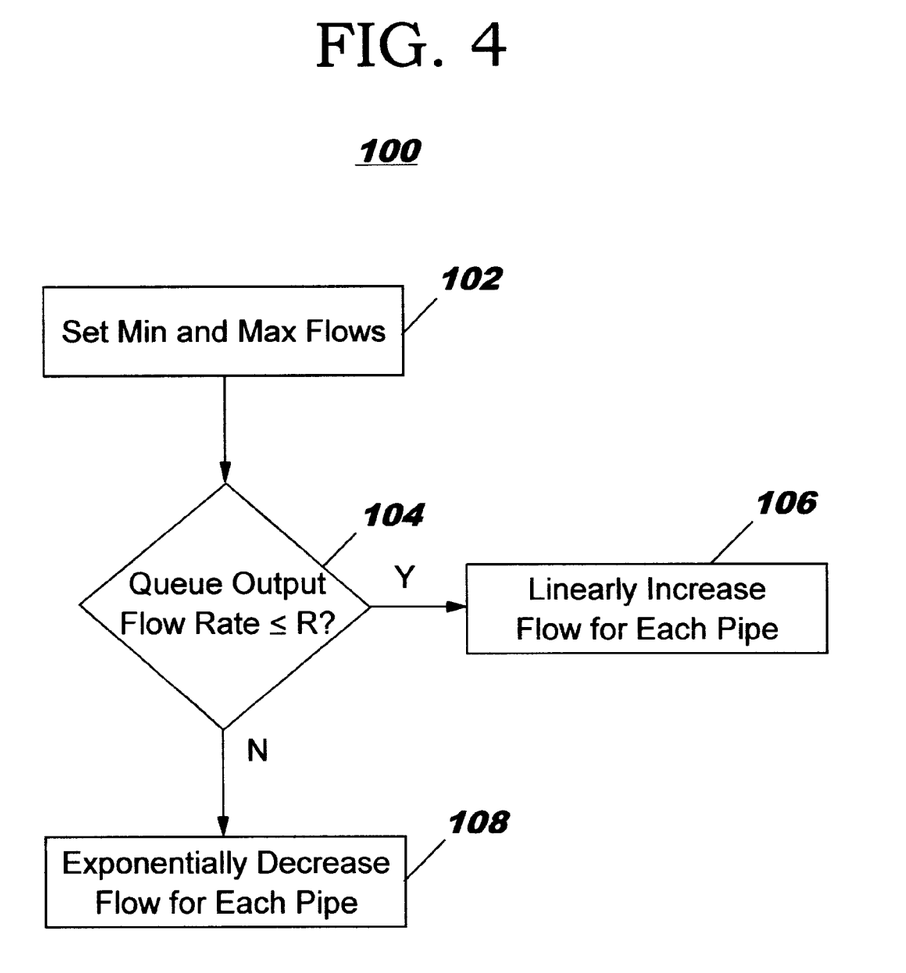
FIG. 4 is a flow diagram illustrating a method for controlling pipe flow rates in accordance with a preferred embodiment of the present invention.

With reference to FIG. 4, there is depicted one embodiment of a flow control method 100 in accordance with the present invention. It can be appreciated by those skilled in the art that FIG. 4 presents a self-consistent sequence of steps leading to a desired result. The steps are those requiring physical manipulation of physical quantities. Usually, although not necessarily, these quantities take the form of electrical or magnetic signals capable of being stored, transferred, combined, compared, and otherwise manipulated. It has proven convenient at times by those skilled in the art, to refer to these signals as bits, values, elements, symbols, characters, terms, numbers, or the like. It should be borne in mind, however, that all of these and similar terms are to be associated with the appropriate physical quantities and are merely convenient labels applied to these quantities.

Further, the manipulations performed are often referred to in terms, such as analyzing or mapping, which are commonly associated with mental operations performed by a human operator. No such capability of a human operator is necessary or desirable in most cases in any of the operations described herein which form part of the present invention; the operations are machine operations. Useful machines for performing operations of a preferred embodiment of the present invention include data-processing systems such as general purpose digital computers or other similar devices. In all cases the distinction between the method operations in operating a computer and the method of computation itself should be borne in mind. The present invention relates to method steps for operating a computer, such as a network processor, in processing electrical or other (e.g. mechanical, chemical) physical signals to generate other desired physical signals.

Flow control method 100 is preferably accomplished using the apparatus disclosed in U.S. patent application Ser. No. 08/762,737, filed on Dec. 10, 1996, entitled "NETWORK PROCESSING COMPLEX AND METHODS" and assigned to the assignee of the present application. Applicants hereby incorporate by reference the above-mentioned co-pending U.S. patent application. Flow control method 100 can be used with the switch 10 or 10' shown in FIGS. 1, 2A and 2B. Thus, flow control method 100 can be carried out in a switch 10 having multiple blades 7, 8 and 9 wherein each of blades 7, 8 or 9 has multiple ports. For the purposes of clarity, flow control method 100 will be explained in conjunction with queue 16 and enqueuing mechanism 14 depicted in FIG. 2A. However, flow control method 100 can be used with other queues, such as queues 22, 28, 34, 16', 22', 28' and 34'. Flow control method 100 can also be used with other enqueuing mechanisms, such as enqueuing mechanisms 20, 26, 32, 14', 20', 26' and 32'. In a preferred embodiment, flow control method 100 is implemented in a system in which multiple queues are part of the same memory resource. However, nothing prevents flow control method 100 from being used in another system in which each queue has a separate memory resource.

Referring to FIGS. 2A and 4, the minimum and maximum flow rate for pipes providing traffic to queue 16 are set, as illustrated at step 102. The pipes may come from any of ports A 12 to enqueuing mechanism 14. In a preferred embodiment, the pipes of interest are behavior aggregate flows. Thus, step 102 preferably sets the minimum and maximum bandwidth for behavior aggregate flows of interest. Furthermore, the sum of the minimum flow rates for the pipes should be less than or equal to the maximum send rate, S, of the shared queue. This is because flows are defined as a fraction of the total amount of traffic that queue 16 can service. The minimum flow for a pipe can be zero. Typically, queue 16 has a defined send rate—the rate at which the queue 16 can output items from the queue. In a preferred embodiment, the sum of the minimum flow rates is less than one-half of the maximum send rate, S. Also in a preferred embodiment, the maximum flow for each pipe is less than or equal to S. Although in a preferred embodiment the maximum number of pipes serviced by queue 16 is less than or equal to 256, there is, in principle, no upper limit on the number of pipes controlled. In addition, each pipe offers traffic to queue 16 at an offered rate, $O_i(t)$, where $i^{th}$ denotes the $i^{th}$ pipe. Depending on different factors, some of the traffic may be dropped. The transmit fraction for the $i^{th}$ pipe, $T_i(t)$, is the fraction of traffic from the $i^{th}$ pipe which is transmitted to queue 16. Thus, the instantaneous flow for the $i^{th}$ pipe is $f_i(t)=O_i(t)*T_i(t)$. In a preferred embodiment, flow control method 100 can also ensure that active pipes maintain at least their minimum flows.

Proceeding to step 104, the presence or absence of excess bandwidth is determined by comparing the output flow rate from queue 16 with a queue output flowrate threshold, R. In a preferred embodiment, excess bandwidth is determined not to exist if the output flow from queue 16 is greater than R. Otherwise, excess bandwidth is determined to exist if the output flow from queue 16 less than or equal to R. If excess bandwidth does exist then an instantaneous excess bandwidth signal, B, is set to one. In an alternate embodiment, B is logically ANDed with one or more additional excess bandwidth signals to form a composite instantaneous bandwidth signal. By utilizing the output flow rate from the shared queue as the guidepost by which excess bandwidth is determined, and as described in further detail hereinbelow, the present invention may be utilized to adjust pipe flows to prevent downstream congestion without the need for delayed feedback from downstream devices.

If it is determined at step 104 that excess bandwidth exists, then the transmission fractions for the pipes are increased linearly, as illustrated at step 106. Preferably, step 106 is accomplished by linearly increasing the transmit fraction, T, for each of the pipes. The linear increase for a pipe can be based on the minimum flow rate, the maximum flow rate, or a weight. Thus, the linear increase for a pipe can be based on the pipe's minimum flow rate only, the maximum flow rate only, some combination of a minimum flow and the weight, some combination of the maximum flow and the weight, or some combination of the minimum and maximum flows and the weight. However, in a preferred embodiment, the linear increase for the pipe is based on the minimum flow for the pipe.

If it is determined in step 104 that excess bandwidth does not exist, then the transmission fractions for the pipes are decreased exponentially, as depicted at step 108. Preferably, step 108 is accomplished by exponentially decreasing T for each pipe. The exponential decrease for a pipe can be based on the minimum flow or the maximum flow. Thus, the exponential decrease for a pipe can be based on the pipe's minimum flow only, the maximum flow only, or some combination of the minimum and maximum flows. However, in a preferred embodiment, the exponential decrease for the pipe is based on the minimum flow for the pipe.

Because flow control method 100 increases flows linearly and decreases flows exponentially, flow control method 100 generally ensures that the traffic through pipes to queue 16 will automatically and asymptotically reach stability. Flows will increase or decrease depending upon whether or not queue 16 has excess bandwidth. When stability is reached, flows will increase linearly as long as excess bandwidth exists, then will decrease exponentially, in response to a lack of excess bandwidth, until excess bandwidth again becomes available. This behavior will repeat. In other words, the traffic from the pipes can settle into a steady cyclic state known as a limit cycle. Thus, regardless of the state in which the traffic through the pipes commences, the system will move toward stable cyclic behavior. This stable behavior may not be achieved utilizing alternative combinations of increases and decreases. For example, an exponential increase and a linear decrease or an exponential increase and an exponential decrease may not produce stable behavior. Furthermore, the increase and decrease in the flow for each pipe depends upon the minimum or maximum flow for the pipe and the previous flow for the pipe. Thus, different pipes may have different levels of flow, or service. Consequently, flow control method 100 not only produces stable behavior, but also provides differentiated services and allocates excess bandwidth for the queue 16 fairly. All a network administrator or other user must do is set the minimum and maximum flow rates for customers differently depending upon the level of service desired for the particular customer. Thus, flow control method 100 can be used in a variety of applications, such as in networks using DiffServ, by internet service providers desiring to provide different levels of service to different customers or for different media. This is accomplished merely by allowing the minimum and maximum flow rates to be set for the behavior aggregate flows, the customers, the media, classes or other flows corresponding to the pipes sharing a common queue.

Figure 5:
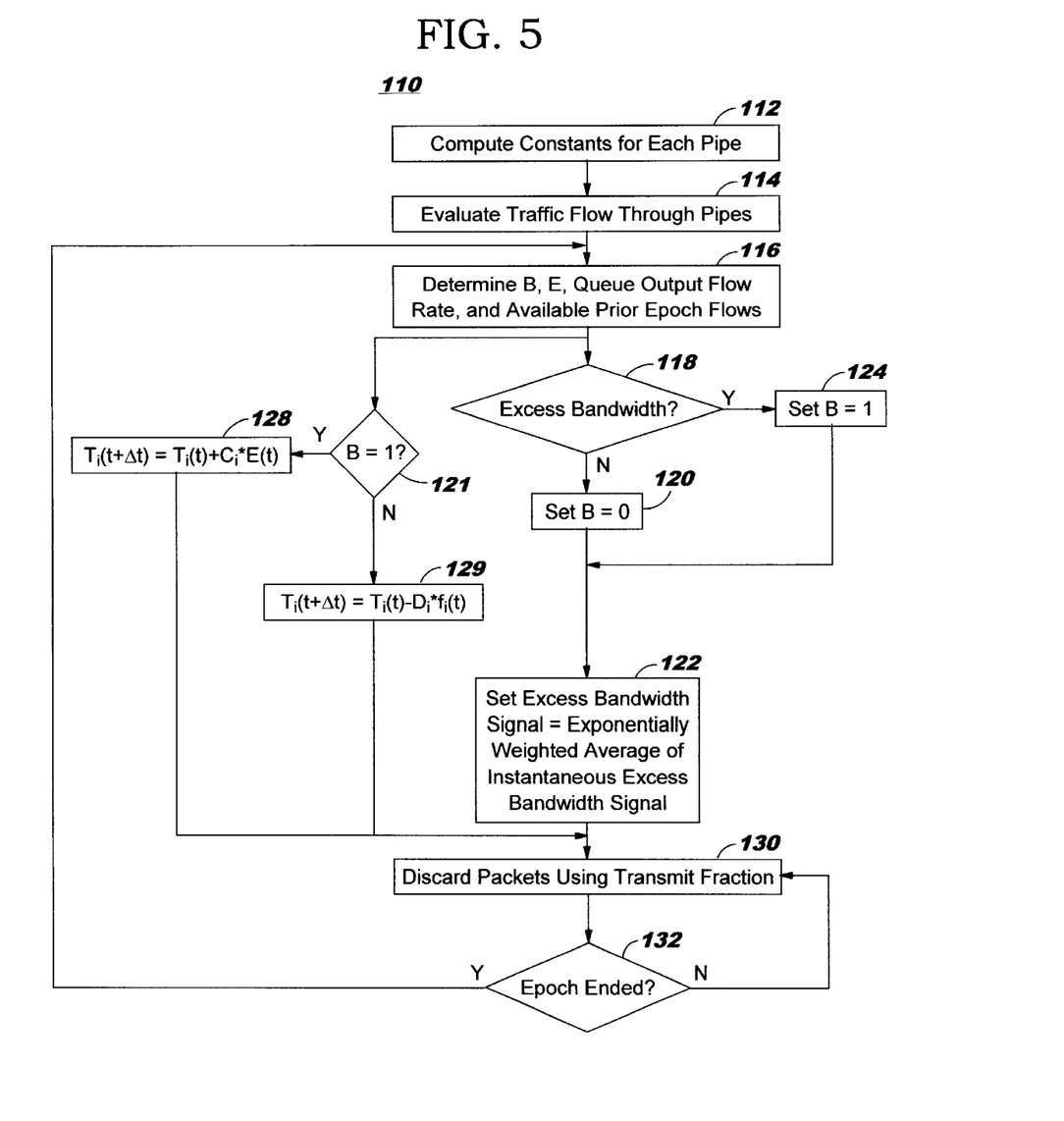
FIG. 5 is a more detailed flow diagram depicting a method for dynamically adjusting pipe flow rates into a shared queue in accordance with one embodiment of the present invention.

With reference now to FIG. 5, there is depicted a more detailed flow diagram of a flow control method 110 for providing differentiated services while maintaining a queue output threshold in accordance with the present invention. Flow control method 110 can be used with switch 10 or 10' shown in FIGS. 1, 2A and 2B. Thus, flow control method 110 can be carried out in switch 10 having multiple blades 7, 8 and 9 and multiple ports on each blade 7, 8 or 9. For the purposes of clarity, flow control method 110 will be explained in conjunction with queue 16 and enqueuing mechanism 14 depicted in FIG. 2A. However, flow method 110 can be used with other queues, such as queues 22, 28, 34, 16', 22', 28' and 34'. Flow control method 110 can also be used with other enqueuing mechanisms, such as the enqueuing mechanisms 20, 26, 32, 14', 20', 26' and 32'. In a preferred embodiment, flow control method 110 is used in a system in which multiple queues are partitioned from a common memory resource. However, nothing prevents the method 110 from being used in another system in which each queue comprises a separate memory resource. Furthermore, flow control method 110 will be described in the context of pipes, however, flow control method 110 can be used for a variety of components, including behavior aggregate flows, which correspond to pipes.

As illustrated in FIG. 5, flow control method 110 commences after the minimum and maximum flows for each of the pipes being controlled have been set (by a network administrator, for example). Constants are computed for each of the pipes based on the minimum and maximum flows for the pipe, as depicted at step 112. For each pipe, i, a constant $C_i$ and a constant $D_i$ are computed in step 112. The constant $C_i$ is utilized for linearly increasing the flow for pipe i, while constant $D_i$ is utilized for exponentially decreasing the flow for pipe i as discussed below. In a preferred embodiment, the constants $C_i$ and $D_i$ are both formulated in accordance with minimum flows. In an alternate embodiment, weights for different pipes can also be provided. In such a case, the constant $C_i$ and $D_i$ may also be calculated based on the weights provided.

Once the constants $C_i$ and $D_i$ are determined, traffic flowing through the pipes to queue 16 is evaluated, as illustrated at step 114. The queue output flow rate, instantaneous excess bandwidth signal, B, and excess bandwidth signal, E, are determined at step 116 for the prior epoch if not already available. In a preferred embodiment, the flows available during the prior epoch are also made available in step 116. Step 116 thus illustrates a determination of the quantities necessary to update flow adjustment parameters for the pipes. It is then determined whether excess bandwidth exists, via step 118. In a preferred embodiment, excess bandwidth is determined to exist only if the output flow rate for queue 16 is less than or equal to a pre-determined threshold flowrate, R. Otherwise it will be determined that excess bandwidth does not exist. In a preferred embodiment, the queue output flow rate evaluated against R is the output flow rate for the entire memory resource. However, nothing prevents the queue output flow rate being determined for a logical queue or subqueue.

If excess bandwidth does not exist, then instantaneous excess bandwidth signal, B, is set to zero, as illustrated at step 120. The signal B is instantaneous because it is based upon a single measurement of the queue output flow rate and a single comparison of the output flow rate with the threshold R. If it is determined in step 118 that excess bandwidth does exist (i.e. output queue flow rate is less than or equal to R), instantaneous excess bandwidth signal B is set to one, as illustrated at step 124. In a preferred embodiment, the excess bandwidth signal E is an exponentially weighted average of the instantaneous excess bandwidth signal determined in accordance with the following relation:

$$E(t + \Delta t) = \left(\frac{31}{32}\right) * E(t) + \frac{B(t + \Delta t)}{32},$$

wherein $\Delta t$=length of an epoch (time since transmit fraction last calculated). In an alternate embodiment of the present invention, the excess bandwidth signal is determined as a function of the instantaneous excess bandwidth signal for the previous epoch in accordance with the relation:

$$E(t + \Delta t) = \left(\frac{31}{32}\right) * E(t) + \frac{B(t)}{32}.$$

If, as determined at step 120, the instantaneous excess bandwidth signal is zero, the excess bandwidth signal, E, is set equal to a constant multiplied by a previous excess bandwidth signal, via step 122. Preferably, the constant is $31/32$ and should generally be less than one.

The excess bandwidth signal E is then set equal to an exponentially weighted average of the instantaneous excess bandwidth signal, via step 122. Thus, in a preferred embodiment, excess bandwidth signal E is a first constant multiplied by a previous excess bandwidth signal plus a second constant multiplied by the instantaneous excess bandwidth signal. The first and second constant may both be less than one and are preferably $^{31}/_{32}$ and $^{1}/_{32}$, respectively.

In a preferred embodiment, a transmit fraction $T_i$ for each pipe i is set in parallel with the steps 118 through 122. However, in an alternate embodiment, the transmit fraction can be updated serially following a determination of instantaneous excess bandwidth signal B and excess bandwidth signal E. If, as determined at step 121, the previous instantaneous excess bandwidth signal B was one (excess bandwidth available), then as depicted at step 128 the transmit fraction for each pipe i is set in accordance with the previous transmit fraction, the constant $C_i$, and excess bandwidth signal E. Preferably, the transmit fraction set in step 128 for previously existing excess bandwidth is determined in accordance with the relation:

$$T_i(t+\Delta t)=T_i(t)+C_i{}^*E(t).$$

Thus, the transmit fraction increases approximately linearly (as changes in E are relatively slow). Furthermore, the transmit fraction will continue to linearly increase as long as excess bandwidth continues to exist.

If excess bandwidth did not exist in the previous epoch (B was zero), then as illustrated at step 129 the transmit fraction, $T_i(t+\Delta t)$ for each pipe i is set in accordance with a previous transmit fraction for the pipe, $T_i(t)$, $D_i$, and the previous flow for the pipe, $f_i(t)$. The transmit fraction when excess bandwidth did not previously exist is preferably determined in accordance with the relation:

$$T_i(t+\Delta t)=T_i-D_i{}^*f_i(t).$$

Thus, the transmit fraction is set in step 129 to ensure that the flow will exponentially decrease as long as an absence of excess bandwidth continues. The constants $C_i$ and $D_i$ are preferably based on minimum flow values. The exact preferred values for the constants $C_i$ and $D_i$ are computed as discussed below, with respect to FIG. 6.

Referring back to FIG. 5, using the transmit fraction calculated in steps 128 and 129, packets passing through switch 10 are transferred or dropped during the epoch, as depicted at step 130. In a preferred embodiment, packets are dropped based not only on the transmit fraction for the pipe in which they are flowing, but also on the priority of each packet. In another embodiment, the packets are dropped randomly. Next, at step 132 a determination is made of whether or not the epoch is completed. If not, traffic continues to be transferred based on the same transmit fractions at step 130. The method returns to step 116 when the epoch is completed.

By increasing flows linearly and decreasing flows exponentially, flow control method 110 functions similarly to flow control method 100 and provides many of the same benefits. Thus, flow control method 110 ensures that the traffic through pipes to the queue 16 can automatically and asymptotically reach a stable cyclic behavior with the shared queue output flow as the guiding parameter. Furthermore, the increase and decrease in the flow for each pipe will depend upon the minimum flow for the pipe and the previous flow for the pipe. Thus, different pipes may have different levels of flow, or service. Consequently, flow control method 110 can allocate produce stable behavior, allocate excess bandwidth for the queue 16 fairly and provide differentiated services. All a network administrator or other user must do is set the minimum and maximum flows for customers differently depending upon the level of service desired for the particular customer. Thus, flow control method 110 can be used in a variety of applications, such as in networks using Diffserv, by internet service providers desiring to provide different levels of service to different customers or for different media. This is accomplished merely by allowing the minimum and maximum flow to be set for the behavior aggregate flows, customers, classes, media, or other flows corresponding to the pipes in flow control method 110.

Furthermore, if the decrease in the flow rate from the transmit fractions is fast enough, the area under the curves describing flows for pipes is proportional to the slope of the linear increase in the flow. The area under the curve for a flow indicates the bits per second flowing through a pipe into the queue 16. The flow through a pipe can also be calculated over an epoch, indicating the exact flow through a pipe. Thus, the flow, or bandwidth as defined in DiffServ, is regulated.

Figure 6:
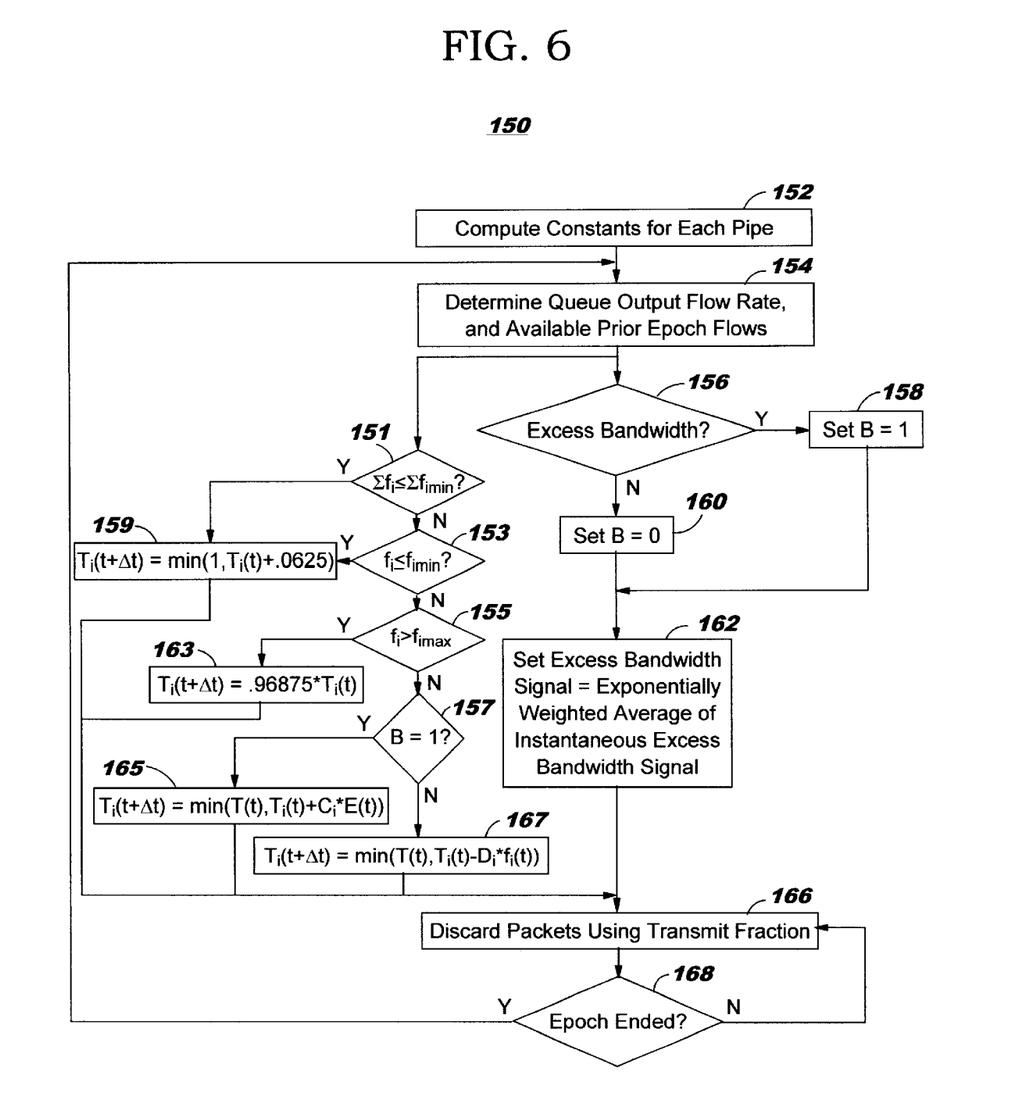
FIG. 6 is a flow diagram illustrating a method for dynamically adjusting pipe flow rates into a shared queue in accordance with a preferred embodiment of the present invention.

FIG. 6 depicts a more detailed flow chart of a preferred embodiment of a method 150 for providing differentiated services. Again, method 150 is preferably accomplished using the apparatus disclosed in U.S. patent application Ser. No. 08/762,737, filed on Dec. 10, 1996, entitled "NETWORK PROCESSING COMPLEX AND METHODS". Method 150 also preferably incorporates the inventions disclosed in U.S. patent application Ser. No. 09/448,380, filed on Nov. 23, 1999, entitled "METHOD AND SYSTEM FOR CONTROLLING TRANSMISSION OF PACKETS IN COMPUTER NETWORKS" and assigned to the assignee of the present application and in U.S. patent application Ser. No. 09/448,190, filed on Nov. 23, 1999, entitled "METHOD AND SYSTEM FOR PROVIDING OPTIMAL DISCARD FRACTION" and assigned to the assignee of the present application. Applicants hereby incorporate the above mentioned copending patent applications. In general, method 150 utilizes the inventions disclosed in two of the above-mentioned co-pending patent applications to control the transmit fractions at a high level when necessary and otherwise uses a method similar to flow control methods 100 and 110.

Method 150 can be used with the switch 10 or 10' shown in FIGS. 1, 2A and 2B. Thus, method 150 can be carried out in a switch 10 having multiple blades 7, 8 and 9 and multiple ports on each blade 7, 8 or 9. For the purposes of clarity, method 150 will be explained in conjunction with queue 16 and enqueuing mechanism 14 depicted in FIG. 2A. However, method 150 can be used with other queues, such as queues 22, 28, 34, 16', 22', 28' and 34'. Method 150 can also be used with other enqueuing mechanisms such as enqueuing mechanisms 20, 26, 32, 14', 20', 26' and 32'. In a preferred embodiment, method 150 is implemented in a system in which multiple queues are part of the same memory resource. However, nothing prevents method 150 from being used in another system in which each queue comprises a separate memory resource. Furthermore, method 150 will be described in the context of pipes, however, method 150 can be used for a variety of components, including behavior aggregate flows, which correspond to pipes.

Method 150 preferably commences after the minimum and maximum flows and, where applicable, weights, for each of the pipes has been set. As discussed previously, the sum of the minimum flows should be less than one and is preferably less than half of the maximum send rate for queue 16. Also in a preferred embodiment, each of the minimum and maximum flows is less than the maximum send rate. In a preferred embodiment, the number of flows is less than or equal to 256. In a preferred embodiment, the weight for each pipe is one and, therefore, does not affect behavior of the switch 10. As discussed above, the offered rate to a queue by a pipe, $O_i$, is multiplied by the transmit fraction for the pipe, $T_i$, in order to obtain the transmitted flow $f_i$ for the pipe i.

Constants for increasing or decreasing the flows for the pipes are determined based on the minimum flows and, where used, the weights, via step 152. Preferably, the constant for increasing the flow, $C_i$, and the constant for decreasing the flow, $D_i$, of a pipe are determined in accordance with the following relation:

$$C_i = (W_i/W) * \left(S + f_{imin} - \sum_j f_{jmin}\right) / (128 * S); \text{ and}$$

$$D_i = (W_i/W) * (S - f_{imin}) / (2 * S).$$

If all of the weights are equal to one, as in a preferred embodiment, then $C_i$ and $D_i$ are determined in accordance with the relations:

$$C_i = \left(S + f_{imin} - \sum_j f_{jmin}\right) / (128 * S); \text{ and}$$

$$D_i = (S - f_{imin}) / (2 * S);$$

wherein $W_i$ represents the weight for the $i^{th}$ pipe, which is preferably in the range (0, 1], W represents the sum of the weights of all pipes feeding into the shared queue, and $f_{jmin}$ represents the minimum flow for the $i^{th}$ pipe. In addition, the flow units are again chosen so that $\Delta t$ and $Q_{max}$ are both one.

The flows for the pipes and the output flow rate of queue 16 are determined as depicted at step 154. If an epoch has just completed, then the flows and queue output flow rate for the previous epoch are determined. The pipe flows and queue output flow rate are determined over the entire epoch. In a preferred embodiment, the queue output flow rate is the output flow rate of the entire memory resource of which queue 16 is a part. However, in another embodiment, the queue output flow rate may be determined for a logical queue or subqueue. In a preferred embodiment, the instantaneous excess bandwidth signal B and the excess bandwidth signal E are made available if not already determined for a previous epoch. Thus, the information required for the ensuing calculations is available.

As illustrated at step 156, a determination is made of whether or not excess bandwidth exists for queue 16. In a preferred embodiment, step 156 includes determining whether the queue output flow rate is less than or equal to a threshold constant, R. If the queue output flow rate is less than R, then as depicted at step 156 a determination is made that excess bandwidth exists. Otherwise, it is determined that excess bandwidth does not exist. In response to a determination at step 156 that excess bandwidth exists, instantaneous excess bandwidth signal B is set to one, as shown at step 158. If not, then the instantaneous excess bandwidth signal B is set to zero as illustrated at step 160.

Excess bandwidth signal E is then set to be an exponentially weighted average of the instantaneous bandwidth signal, as depicted at step 162. In a preferred embodiment, the exponentially weighted excess bandwidth signal is determined in accordance with the relation:

$$E(t + \Delta t) = \left(\frac{31}{32}\right) * E(t) + \frac{B(t + \Delta t)}{32};$$

wherein $E(t+\Delta t)$ represents the excess bandwidth signal for the current epoch, $E(t)$ represents the excess bandwidth signal for the previous epoch, and $B(t+\Delta t)$ represents the instantaneous excess bandwidth signal for the current epoch. In an alternate embodiment, the exponentially weighted excess bandwidth signal is determined as a function of the instantaneous excess bandwidth signal for the previous epoch in accordance with the relation:

$$E(t + \Delta t) = \left(\frac{31}{32}\right) * E(t) + \frac{B(t)}{32}$$

In parallel with the updating of the instantaneous bandwidth signal and the bandwidth signal at steps 156 through 162, the transmit fraction for the current epoch is updated. To set the transmit fraction for a particular pipe, the present invention utilizes a hierarchy of pipes and subpipes wherein if a subpipe offers traffic at or below its guaranteed rate (i.e. minimum rate), then it is fully transmitted. Furthermore, if a subpipe is within a set of subpipes, and if the sum of offered rates of the subpipes is at or below the sum of the guaranteed rates of the subpipes, then each subpipe is fully transmitted. The algorithm for implementing this hierarchical flow rate control begins at step 151.

As depicted at step 151, a determination is made of whether or not the sum of individual pipe flows into queue 16 is less than or equal to the sum of the guaranteed rates (i.e. minimum rates) for the pipes. If so, and as illustrated at step 159, the transmit fraction for pipe i is set equal to the lesser of one or a constant added to the previous value of $T_i$ in accordance with the relation:

$$T_i(t+\Delta t) = \min(1, T_i(t) + K).$$

The constant K added to the previous value of T is a fraction between zero and one and in a preferred embodiment is equal to 0.0625.

If it is determined at step 151 that the sum of individual pipe flows into queue 16 is greater than the collective sum of the guaranteed rates, then as depicted at step 153, a further determination is made of whether or not an individual pipe i has a flow $f_i$ that is less than or equal to the minimum (i.e. guaranteed) flow rate assigned to pipe i. If so, $T_i$ is determined in accordance with step 159 as described above. If, as depicted at step 155, individual pipe flow $f_i$ is greater than the minimum flow rate of pipe i, a determination is made of whether or not $f_i$ is greater than the maximum possible flow rate for pipe i. If $f_i$ is greater than the maximum possible flow rate for pipe i, then as depicted at step 163, the transmit fraction for pipe i is set equal to the previous value of $T_i$ multiplied by a constant in accordance with the relation:

$$T_i(t+\Delta t) = Y * T_i(t).$$

The constant Y multiplied with the previous value of $T_i$ is a fraction within the range (0, 1) and in a preferred embodiment is equal to 0.96875.

In response to a negative response to the inquiries depicted at steps 151, 153, and 155, the previous value of the instantaneous excess bandwidth signal B is evaluated as shown at step 157. If, as determined at step 157, the previous instantaneous excess bandwidth signal B was one (excess bandwidth available), then as depicted at step 165 the transmit fraction for each pipe i is set in accordance with the previous transmit fraction, the constant $C_i$, and excess bandwidth signal E in accordance with the relation:

$$T_i(t+\Delta t)=\min(T(t), T_i(t)+C_i*E(t)),$$

wherein T(t) represents a global transmit fraction defined below.

If excess bandwidth did not exist in the previous epoch (B was zero), then as illustrated at step 167 the transmit fraction, $T_i(t+\Delta t)$ for each pipe i is set based on the previous transmit fraction for the pipe, $T_i(t)$, $D_i$, and the previous flow for the pipe, $f_i(t)$ in accordance with the relation:

$$T_i(t+\Delta t)=\min(T(t), T_i(t)-D_i*f_i(t)).$$

Thus, the transmit fraction is set in step 167 to ensure that the flow will exponentially decrease as long as an absence of excess bandwidth continues.

As illustrated in FIG. 6, the transmit fraction is set such that the minimum flow is provided for each active pipe when possible, such that the flow for each pipe does not exceed the maximum; the flow increases linearly or decreases exponentially as long as the queue 16 (or corresponding memory resource) has not exceeded a desired level. The global transmit fraction T(t) may reflect depletion of storage resources. If a pipe is transmitting above its minimum rate, then the above use of the minimum global T(t) and the pipe-by-pipe $T_i(t)$ can, during episodes of severe congestion, reduce the transmission fraction faster than the above exponential decrease in a pipe-by-pipe computation.

Preferably, the global transmit fraction is determined in accordance with the relation:

$$T(t+\Delta t)=T(t)+\max\{0.125, \min\{1, T(t)+2*O(t)/S*M(t)*(9/4-2*T(t)-2*M(t)*Q(t)/Q_{max})\}\};$$

wherein M(t) represents the multiplier from the previous epoch, $\Delta t$ represents the length of the epoch in appropriate time units, S represents the maximum send rate of a shared queue, O represents the total offered flow rate for the pipe, and Q represents the queue occupancy. The value of O(t)/S is the offered input flow rate load O(t) of all incoming traffic divided by the maximum possible queue send rate S. The value $Q(t)/Q_{max}$ is the determined queue occupancy as a fraction of the maximum possible queue occupancy. The value of M(t) is in the interval [½, 1]. If M(t) is consistently ½, then congestion is not extreme. But if congestion is extreme, the M(t) is 1 or nearly 1. Extreme congestion corresponds to depletion of storage to below a programmable, extreme threshold. A signal having a value of 0 (i.e. depletion is extreme), else 1, is obtained by periodically sampling to determine depletion of storage capacity relative to the threshold storage capacity. If the signal is 1, then the value of M(t) is maintained at 1 or increased toward 1. Exponentially weighted average is a preferred method for decreasing or increasing M(t). In a preferred embodiment M is repeatedly determined for each epoch in accordance with the relation:

$$M(t+\Delta t)=\min\{1, M(t)*31/32+(\text{if}Q(t)/Q_{max}\geq½, \text{then}¼, \text{else}\text{\small1/64})\}$$

In a preferred embodiment, M (as determined by the foregoing relation), together with the global transmit fraction ensures that the queue level and global transmit fraction are critically damped and that oversubscription can be accounted for.

Figure 7:
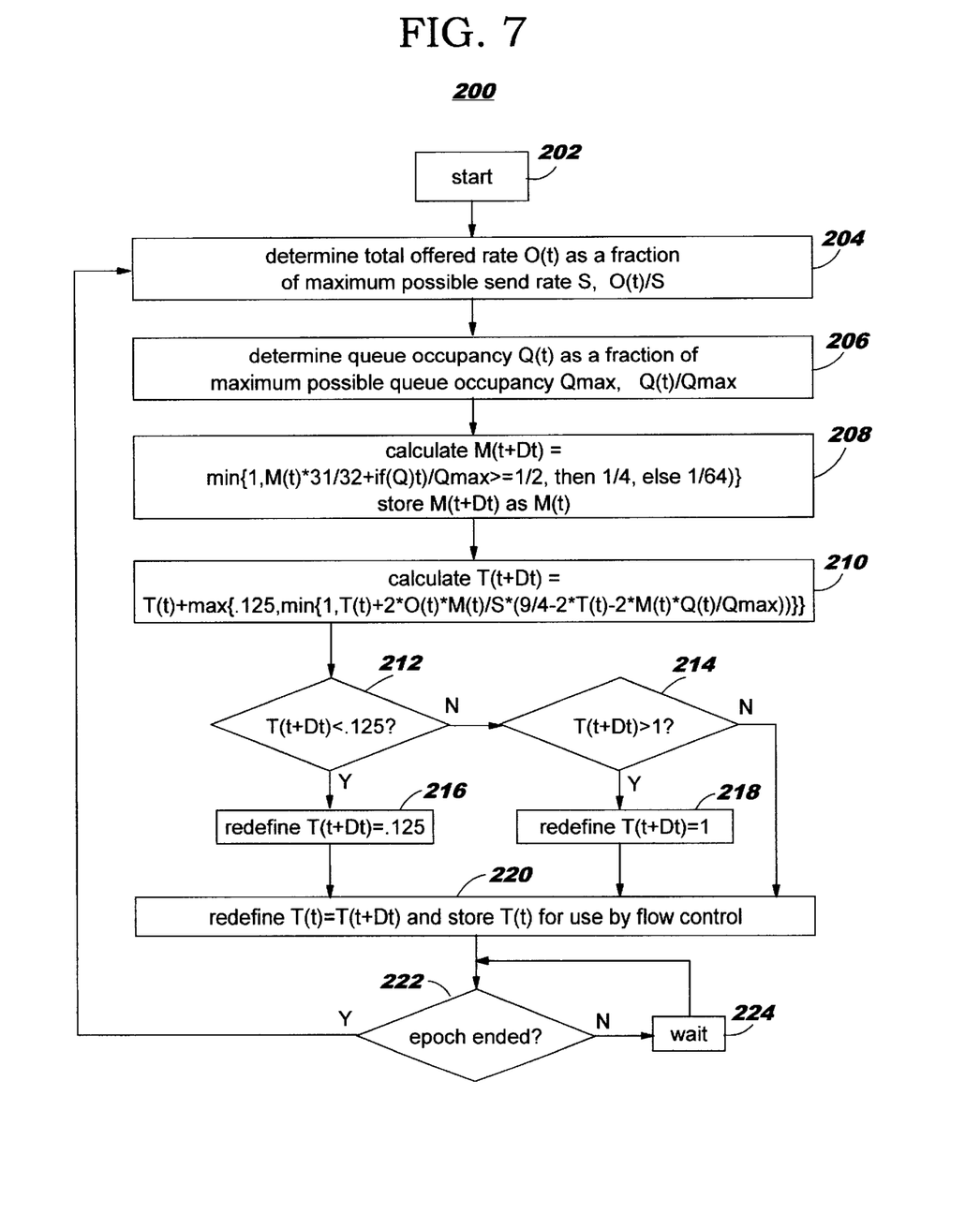

As illustrated in FIG. 7, a preferred embodiment of the present invention entails computing the global transmit fraction T(t) as follows. Global transmit fraction computation begins as depicted at step 202 and proceeds to step 204 wherein the total offered rate O(t) as a fraction of the maximum send rate S is determined as O(t)/S. Next, as illustrated at step 206 the present queue occupancy Q(t) is determined as a fraction of the total queue capacity $Q_{max}$ in accordance with the relation $Q(t)/Q_{max}$.

Proceeding to step 208, the value of multiplier term M(t) is updated in accordance with the relation:

$$M(t+\Delta t)=\min\{1, M(t)*31/32+\text{if}(Q(t)/Q_{max}\geq½, \text{then}¼, \text{else}\text{\small1/64})\}.$$

The value of the global transmit fraction T(t) is then updated in accordance with the relation:

$$T(t+\Delta t)=T(t)+\max\{0.125, \min\{1, T(t)+2*O(t)*M(t)/S*(9/4-2*T(t)-2*M(t)*Q(t)/Q_{max})\}\};$$

wherein the variables O(t), M(t), S, Q(t), and $Q_{max}$ represent values as described heretofore. As illustrated at inquiry step 212, a determination is made of whether or not the updated transmit fraction $T(t+\Delta t)$ is less than a constant, which in a preferred embodiment is equal to 0.125. If so, and as depicted at steps 216 and 220, the updated transmit fraction $T(t+\Delta t)$ is redefined to equal 0.125 and the global transmit fraction is set equal to the updated transmit fraction and is stored for use in flow control from the shared queue.

If, as determined at step 212, $T(t+\Delta t)$ is equal to or greater than 0.125, a further determination is made at step 214 of whether or not $T(t+\Delta t)$ is greater than 1. If so, and as depicted at steps 218 and 220, the updated transmit fraction is redefined to equal 1 and the global transmit fraction is set equal to the updated transmit fraction and is stored for use in flow control from the shared queue. Following the updating of the transmit fraction at step 210 and possible redefinition thereof at steps 216 or 218, the process continues after a determination at steps 222 and 224 that the current epoch has ended to step 204 where the next transmit fraction update cycle begins.

Returning to FIG. 6, and based on the transmit fraction determined at step 159, 163, 165 or 167, packets, or pieces of traffic, for the pipes are transmitted or dropped, as depicted at step 166. In a preferred embodiment, step 166 accounts for the priority of a packet when determining whether to drop a particular packet. In another embodiment, individual packets are randomly dropped to maintain the calculated transmit fractions.

A determination is then made as illustrated at step 168 of whether or not the epoch has completed. If not, the packets continue to be dropped or transmitted, via step 166. If the epoch has completed, the process returns to step 154 wherein the values for the next epoch are updated.

Method 150 provides the same benefits as flow control methods 100 and 110 thus, differentiated services can be provided in a stable manner and excess bandwidth can be allocated fairly. This is accomplished with minimal effort by the user, merely setting the minimum and maximum flows for the pipes. Method 150 can also be used in a variety of applications, such as in networks using DiffServ, by internet service providers desiring to provide different levels of service for different customers, classes, behavior aggregate flows or different media. This is accomplished merely by allowing the minimum and maximum flow to be set for the behavior aggregate flows, the customers, the media, or other flows corresponding to the pipes in method 150. Thus, the flow through the pipe, a DiffServ criterion of service, can be regulated as desired.

Furthermore, method 150 takes advantage of the additional benefits of two of the above-mentioned co-pending patent applications. Because the global transmit fraction can be used, method 150 can account for higher congestion in an efficient mariner. Use of the multiplier, which corresponds to a virtual maximum queue output flow rate, ensures that the switch can remain stable over a wide range of subscriptions. Furthermore, since the global transmit fraction is, in a sense, critically damped, the system described by the queue output flow rate and global transmit fraction will rapidly reach a stable state. Consequently, method 150 allows the desired transmission rates for equilibrium to be rapidly achieved.

It is envisioned that in general, switch 10 or 10' will implement the portion of method 150 that corresponds to flow control methods 100 and 110. Thus, the pipes will generally be regulated such that a stable limit cycle is achieved. In a preferred embodiment, the flow through a pipe will increase until the output flow rate of the shared queue is greater than a predetermined threshold, and will decrease until the output flow rate of the shared queue level is less than or equal to the threshold. It is believed that this will be the normal mode of operation. However, in critical cases, for example because several pipes suddenly become active and require their minimum flows or the queue output flow rate exceed a threshold, another methodology may become active. When the critical, and typically transitory, state has been accounted for, the transmit fractions which result in the stable limit cycle will again be used. Thus, a switch using the method 150 may operate effectively over a wider range of subscriptions.

A method and system has been disclosed for controlling traffic through a network. Software written according to the present invention is to be stored in some form of computer readable medium, such as memory, CD-ROM or transmitted over a network, and executed by a processor. Alternatively, some or all of the present invention could be implemented in computer hardware such as a network processor associated with a shared queue. Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

While the invention has been particularly shown and described with reference to a preferred embodiment, it will be understood by those skilled in the art that various changes in form and detail may be made therein without departing from the spirit and scope of the invention.

What is claimed is:

1. A method for dynamically adjusting the flow rate of a plurality of pipes that feed into a shared queue, said method comprising:
   setting a minimum flow rate and a maximum flow rate for each of said plurality of pipes;
   determining whether or not there is an excess queue bandwidth in said plurality of pipes by multiplying an offered rate with a transmit fraction;
   in response to a determination that there is an excess queue bandwidth in said plurality of pipes, linearly increasing a flow rate of a pipe; and
   in response to a determination that there is no excess queue bandwidth in said plurality of pipes, exponentially decreasing a flow rate of a pipe.

2. The method of claim 1, wherein said step of determining whether or not excess bandwidth exists comprises comparing said queue output flow rate with a pre-determined threshold queue output value.

3. The method of claim 2, wherein said step of determining whether or not excess bandwidth exists further comprises setting an instantaneous bandwidth signal in accordance with a single comparison of said queue output flow rate with said pre-determined threshold queue output value.

4. The method of claim 3, wherein said step of determining whether or not excess bandwidth exists further comprises setting an excess bandwidth signal to be an exponentially weighted average of said instantaneous excess bandwidth signal.

5. The method of claim 1, wherein said step of linearly increasing a flow rate of a pipe further comprises setting said transmit fraction for said pipe in accordance with the relation:

$$T_i(t+Dt)=T_i(t)+C_i*E(t),$$

wherein $T_i(t+Dt)$ represents the transmit fraction for a current epoch, $T_i(t)$ represents the transmit fraction for a previous epoch, $C_i$ represents a constant for increasing the flow rate, and $E(t)$ represents an excess bandwidth value for said shared queue.

6. The method of claim 5, wherein $C_i$ is determined in accordance with the relation:

$$C_i = (W_i/W)*\left(S + f_{imin} - \sum_j f_{jmin}\right)/(128*S),$$

wherein $W_i$ represents the weight for the $i^{th}$ pipe, which is preferably in the range (0,1), W represents the sum of the weights of all pipes feeding into said shared queue, and $f_{imin}$ represents the minimum flow for the $i^{th}$ pipe, and S represents the maximum send rate of a shared queue.

7. The method of claim 1, wherein said step of exponentially decreasing a flow rate of a pipe further comprises setting a transmit fraction for said pipe in accordance with the relation:

$$T_i(t+\Delta t)=T_i-D_i*f_i(t),$$

wherein $T_i(t+Dt)$ represents a transmit fraction for a current epoch, $T_i(t)$ represents a transmit fraction for a previous epoch, $D_i$ represents a constant for decreasing the flow rate, and $E(t)$ represents an excess bandwidth value for said shared queue.

8. The method of claim 7, wherein $D_i$ is determined in accordance with the relation:

$$D_i=(W_i/W)*(S-f_{imin})/(2*S),$$

wherein $W_i$ represents the weight for the $i^{th}$ pipe, which is preferably in the range (0,1], W represents the sum of the weights of all pipes feeding into said shared queue, and $f_{imin}$ represents the minimum flow for the $i^{th}$ pipe, and S represents the maximum send rate of said shared queue.

9. The method of claim 1, wherein said plurality of pipes forms a hierarchy of pipes and subpipes wherein if a subpipe offers traffic at or below its guaranteed minimum rate then it is fully transmitted.

10. The method of claim 9, wherein said plurality of pipes may be divided into a plurality of behavior aggregate flows.

11. The method of claim 10, wherein each of said plurality of behavior aggregate flows comprises a plurality of subpipes, and wherein said method further comprises in response to the sum of offered rates of said plurality of subpipes being at or below the sum of the guaranteed minimum rates of said plurality of subpipes, fully transmitting each of said plurality of subpipes.

12. A system for dynamically adjusting the flow rate of a plurality of pipes that feed into a shared queue, said system comprising:

processing means for setting a minimum flow rate and a maximum flow rate for each of said plurality of pipes;

processing means for determining whether or not there is an excess queue bandwidth in said plurality of pipes by multiplying an offered rate with a transmit fraction;

processing means for linearly increasing a flow rate of a pipe, in response to a determination that there is an excess queue bandwidth in said plurality of pipes; and processing means for linearly exponentially decreasing a flow rate of a pipe, in response to a determination that there is no excess queue bandwidth in said plurality of pipes.

13. The system of claim 12, further comprising processing means for comparing said queue output flow rate with a pre-determined threshold queue output value.

14. The system of claim 13, further comprising processing means for setting an instantaneous bandwidth signal in accordance with a single comparison of said queue output flow rate with said pre-determined threshold queue output value.

15. The system of claim 14, further comprising processing means for setting an excess bandwidth signal to be an exponentially weighted average of said instantaneous excess bandwidth signal.

16. The system of claim 15, further comprising processing means for setting said transmit fraction for said pipe in accordance with the relation:

$$T_i(t+Dt)=T_i(t)+C_i*E(t),$$

wherein $T_i(t+Dt)$ represents the transmit fraction for a current epoch, $T_i(t)$ represents the transmit fraction for a previous epoch, $C_i$ represents a constant for increasing the flow rate, and $E(t)$ represents an excess bandwidth value for said shared queue.

17. The system of claim 16, further comprising processing means for determining $C_i$ in accordance with the relation:

$$C_i = (W_i/W)*\left(S+f_{imin}-\sum_j f_{jmin}\right)/(128*S),$$

wherein $W_i$ represents the weight for the $i^{th}$ pipe, which is preferably in the range (0,1], W represents the sum of the weights of all pipes feeding into said shared queue, and $f_{imin}$ represents the minimum flow for the $i^{th}$ pipe, and S represents the maximum send rate of a shared queue.

18. The system of claim 15, further comprising processing means for setting a transmit fraction for said pipe in accordance with the relation:

$$T_i(t+\Delta t)=T_i-D_i*f_i(t),$$

wherein $T_i(t+Dt)$ represents a transmit fraction for a current epoch, $T_i(t)$ represents a transmit fraction for a previous epoch, $D_i$ represents a constant for decreasing the flow rate, and $E(t)$ represents an excess bandwidth value for said shared queue.

19. The system of claim 18, further comprising processing means for determining $D_i$ in accordance with the relation:

$$D_i=(W_i/W)*(S-f_{imin})/(2*S),$$

wherein $W_i$ represents the weight for the $i^{th}$ pipe, which is preferably in the range (0,1], W represents the sum of the weights of all pipes feeding into said shared queue, and $f_{imin}$ represents the minimum flow for the $i^{th}$ pipe, and S represents the maximum send rate of said shared queue.

20. The system of claim 15, wherein said plurality of pipes forms a hierarchy of pipes and subpipes, said system further comprising processing means for responsive to a subpipe offering traffic at or below its guaranteed minimum rate for fully transmitting said subpipe.

21. The system of claim 20, wherein said plurality of pipes may be divided into a plurality of behavior aggregate flows.

22. The system of claim 21, wherein each of said plurality of behavior aggregate flows comprises a plurality of subpipes, and wherein said system further comprises processing means responsive to the sum of offered rates of said plurality of subpipes being at or below the sum of the guaranteed minimum rates of said plurality of subpipes, for fully transmitting each of said plurality of subpipes.

23. A computer program product for dynamically adjusting the flow rate of a plurality of pipes that feed into a shared queue, said computer program product comprising:

instructions means for setting a minimum flow rate and a maximum flow rate for each of said plurality of pipes;

instruction means for determining whether or not there is an excess queue bandwidth in said plurality of pipes by multiplying an offered rate with a transmit fraction;

instruction means of for linearly increasing a flow rate of a pipe, in response to a determination that there is an excess queue bandwidth in said plurality of pipes; and instruction means for linearly exponentially decreasing a flow rate of a pipe, in response to a determination that there is no excess queue bandwidth in said plurality of pipes.

24. The computer program product of claim 23, further comprising instruction means for comparing said queue output flow rate with a pre-determined threshold queue output value.

25. The computer program product of claim 24, further comprising instruction means for setting an instantaneous bandwidth signal in accordance with a single comparison of said queue output flow rate with said pre-determined threshold queue output value.

26. The computer program product of claim 25, further comprising instruction means for setting an excess bandwidth signal to be an exponentially weighted average of said instantaneous excess bandwidth signal.

27. The computer program product of claim 23, further comprising instruction means for setting said transmit fraction for said pipe in accordance with the relation:

$$T_i(t+Dt)=T_i(t)+C_i*E(t),$$

wherein $T_i(t+Dt)$ represents the transmit fraction for a current epoch, $T_i(t)$ represents the transmit fraction for a previous epoch, $C_i$ represents a constant for increasing the flow rate, and $E(t)$ represents an excess bandwidth value for said shared queue.

28. The computer program product of claim 27, further comprising instruction means for determining $C_i$ in accordance with the relation:

$$C_i = (W_i/W) * \left( S + f_{i\text{min}} - \sum_j f_{j\text{min}} \right) / (128 * S),$$

wherein $W_i$ represents the weight for the $i^{th}$ pipe, which is preferably in the range (0,1], W represents the sum of the weights of all pipes feeding into said shared queue, and $f_{imin}$ represents the minimum flow for the $i^{th}$ pipe, and S represents the maximum send rate of a shared queue.

29. The computer program product of claim 27, further comprising instruction means for setting a transmit fraction for said pipe in accordance with the relation:

$$T_i(t+\Delta t) = T_i - D_i * f_i(t),$$

wherein $T_i$(t+Dt) represents a transmit fraction for a current epoch, $T_i$(t) represents a transmit fraction for a previous epoch, $D_i$ represents a constant for decreasing the flow rate, and E(t) represents an excess bandwidth value for said shared queue.

30. The computer program product of claim 29, further comprising instruction means for determining $D_i$ in accordance with the relation:

$$D_i = (W_i/W) * (S - f_{imin})/(2*S),$$

wherein $W_i$ represents the weight for the $i^{th}$ pipe, which is preferably in the range (0,1], W represents the sum of the weights of all pipes feeding into said shared queue, and $f_{imin}$ represents the minimum flow for the $i^{th}$ pipe, and S represents the maximum send rate of said shared queue.

31. The computer program product of claim 27, wherein said plurality of pipes forms a hierarchy of pipes and subpipes, said computer program product further comprising instruction means for responsive to a subpipe offering traffic at or below its guaranteed minimum rate for fully transmitting said subpipe.

32. The computer program product of claim 31, wherein said plurality of pipes may be divided into a plurality of behavior aggregate flows.

33. The computer program product of claim 32, wherein each of said plurality of behavior aggregate flows comprises a plurality of subpipes, and wherein said computer program product further comprises instruction means responsive to the sum of offered rates of said plurality of subpipes being at or below the sum of the guaranteed minimum rates of said plurality of subpipes, for fully transmitting each of said plurality of subpipes.

\* \* \* \* \*